Sept. 8, 1959     E. H. KOENIG     2,902,761
SCRIBING INSTRUMENT
Filed Sept. 17, 1956
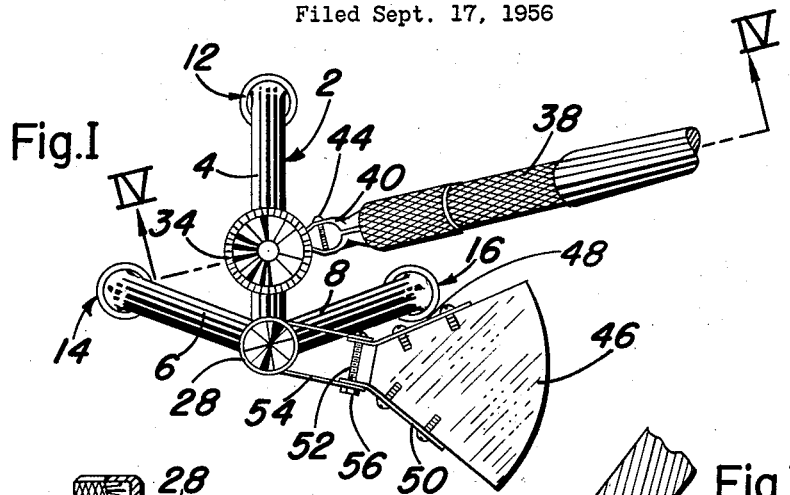
Fig. I
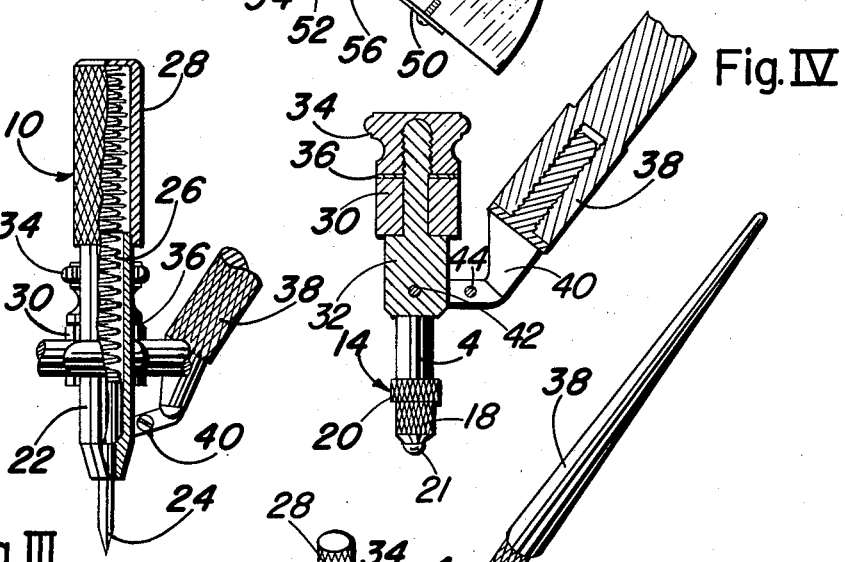
Fig. IV
Fig. III
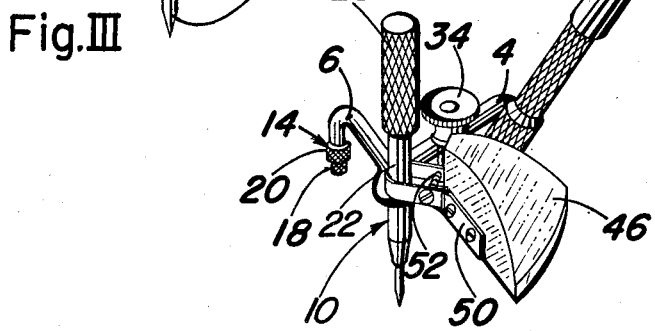
Fig. II
INVENTOR.
EUGENE H. KOENIG
ATTORNEY

United States Patent Office 2,902,761
Patented Sept. 8, 1959

2,902,761

SCRIBING INSTRUMENT

Eugene H. Koenig, Teaneck, N.J., assignor to Keuffel & Esser Company, Hoboken, N.J., a corporation of New Jersey Application September 17, 1956, Serial No. 610,320

3 Claims. (Cl. 30—164.9)

This invention relates to a scribing instrument of the type used in map making.

In map making, extensive use is made of scribe material which is made up of a plastic foil coated on one side with an opaque scribable coating. The map is then scribed in the coated surface and a drawing made in this manner can be used directly as a negative for reproduction of the map on photosensitive materials by contact exposure. One type of scribing instrument which has been used for the production of drawings such as maps on these scribe coated materials is constructed in the form of a tripod having three feet for engaging the surface to be scribed. The scribing tool is located at the center of the tripod and is forced against the coated surface by means of a spring with the necessary amount of pressure to cut through the coating. A handle in the form of a conventional pen handle is pivotably attached to the central portion of the instrument which carries the scribing point.

It has been found that this type of scribing instrument has several disadvantages. In particular, it is not well suited to scribing in conjunction with guide means such as rulers, T squares, straightedges, French curves and the like because since the scribing tool contacts the surface to be scribed at a point centrally located between the three feet of the tripod which also contact the surface to be scribed, it is impossible to bring the scribing tool against the guide means as is usually done in drawing with a pencil or pen. While it is theoretically possible to draw straight lines with this prior art instrument by sliding two of the tripod feet against a straightedge, most draftsmen and map makers prefer to have the scribing point directly in contact with the straightedge. On the other hand, when using a French curve or any other type of curve conventionally used in drawing it is impossible to follow the contour of the curve unless the scribing point is directly in contact with the curve itself.

Some of the prior art scribers have also been provided with magnifiers for observing the scribing tool during the scribing operation. These magnifiers have been in the form of lenses molded of clear plastic material and mounted in a fixed position with the lens axis centered above the scribing point. It has been found that in order to use a magnifier mounted in this manner, it is necessary for the draftsman's line of sight to have a certain angular relationship with the surface of the drawing. This makes the use of such a magnifier awkward since it is not convenient for the draftsman to maintain the required relationship as he works on different parts of the drawing.

The objects of the present invention are to overcome the disadvantages of the prior art scribing instrument discussed above. These objects of the invention and the means for their attainment will be more fully understood after reading the following description taken in conjunction with the accompanying drawing in which:

Fig. I is a view in plan of the new scribing instrument.

Fig. II is a view in perspective of the new scribing instrument.

Fig. III is a partial view in enlarged elevation partly in section showing the spindle which carries the scribing tool.

Fig. IV is a view in sectional elevation taken along the line IV—IV in Fig. I and looking in the direction of the arrows.

In general, the scribing instrument of the present invention includes a tripod having three feet for engaging the surface to be scribed, a handle pivotally attached to the tripod which when projected into the plane of the drawing falls within the triangle formed by the three feet and a scribing tool carried by the tripod and projecting into the surface to be scribed at a point outside the triangle formed by the three feet of the tripod. In addition, a magnifier is carried on a spindle which carries the scribing tool but this magnifier may be pivoted about an axis in a plane perpendicular to the axis of the scribing tool as well as rotated about the axis of the scribing tool for easy viewing of the scribing point at any angle.

Referring to the drawings, the tripod 2 is made up of three legs 4, 6 and 8 extending outwardly and then downward from the vertical tubular member or spindle 10. The lower ends of the legs 4, 6 and 8 terminate in feet 12, 14 and 16. The feet 12, 14 and 16 should be adapted to slide freely over the surface to be scribed. Preferably, a knurled screw 18 as shown in Fig. IV is threaded into the lower end of the leg 4 and secured thereon by a knurled lock nut 20. The knurled screw 18 carries antifriction means at its lower end which preferably takes the form of a polished steel ball 21 of the type used in ball bearings. This ball may be held in an opening in the head of the screw 18 by spinning some of the material of the head around the ball. An anti-friction washer which may, for example, be made of polytetrafluoroethylene may be provided in the opening in the head of the screw 18 above the ball.

As shown in Fig. III, the spindle 10 includes a vertical tubular member 22 in which the scribing tool 24 is free to slide in a vertical direction. The scribing tool 24 is urged downwardly by a compression spring 26 engaging its upper end. The upper end of the compression spring 26 is confined by a cap 28 which is held on the vertical tubular member 22 by threads. The cap 28 is knurled to facilitate turning the cap 28 with respect to the vertical tubular member 26 in order to raise or lower the cap and thereby decrease or increase the compression of the spring 26 and thereby adjust the pressure applied to the scribing tool 24. The legs 4, 6 and 8 may be brazed on to the vertical tubular member 22 and extend outwardly therefrom as shown. The legs 4, 6 and 8 together with tubular member 22 form a frame in which the free ends of the legs define supporting feet 12, 14 and 16 respectively and the tubular member 22 which carries the scribing tool is mounted on the portion of the frame extending outside of the imaginary triangle formed by the feet 12, 14 and 16 respectively in a direction opposite the foot 12 and lying generally between the other two feet 14 and 16. A resiliently pressed scribing tool is mounted on the extending portion of the frame at a location outside of said imaginary triangle and normally projecting below the plane of the feet. In use the instrument may be positioned on two of its feet and the scriber accurately positioned at the point of marking and thereafter the third foot may be moved into engagement with the supporting surface and the scriber can be manipulated by the handle 38 to follow the outline.

A bearing 30 shown in Figs. III and IV is provided in the arm 4. This bearing may be provided in the arm by making the arm 4 in two sections each of which is brazed to the bearing 30. A shaft 32 extends upward through the bearing 30 and is provided with a shoulder which engages the lower surface of the bearing 30 to locate the shaft in a definite axial position. The upper end of the shaft 32 is threaded and engages the knurled nut 34. A spring washer 36 is provided between the lower surface of the knurled nut 34 and the upper surface of the bearing 30. By means of the knurled nut 34, the shaft 32 may be clamped in any desired position. In the position shown in Fig. I, the scriber handle extends to the right which would be the position ordinarily preferred by a right-handed draftsman. By loosening the nut 34 the handle 38 may also be turned to a position between the arms 4 and 6 which would ordinarily be preferable for a left-handed person.

The handle 38 is attached to the shaft 32 by a forked member 40 which is provided with a threaded extension which internally engages the handle 38. A horizontal pin 42 is pressed into a hole in the shaft 32 and engages a hole in each prong of the forked member 40. This construction permits the handle 38 to pivot with respect to the shaft 32. A screw 44 passes through one prong of the forked member 40 and is threaded into a hole of the other prong for adjusting the spacing between the two prongs and thereby the friction at the pivot between the handle 38 and the shaft 32.

The magnifier 46 is in the form of a segment of a lens. Two metal strips 48 and 50 are attached along the radial surface of the lens segment 46 by screws as shown. The ends of these strips 48 and 50 are bent and provided with holes to permit the screw 52 to pass through both strips 48 and 50. A third metal strip 54 is bent around the vertical tubular member 22 and is also provided with holes to permit the screw 52 to pass through both ends of the strip 54. The head of the screw 52 and the nut 56 hold the metal strip 54 on the screw 52 and against the ends of the metal strips 48 and 50. By tightening the nut 56 on the screw 52, it is possible to adjust the friction between the metal strip 54 and the vertical tubular member 22 which holds the lens 46 in any desired position around the spindle as shown. The lens 46 may also be pivoted up or down about the screw 52 as an axis to permit the scribing tool 24 to be observed from any desired angle.

Having thus described the invention, what is claimed is:

1. A scribing instrument comprising a frame having three legs, the free ends defining supporting feet arranged in triangular relation to form an imaginary triangle, said frame having a portion extending outside of said imaginary triangle in a direction opposite one of said legs and generally between the other two legs or feet, a resiliently pressed scribing tool mounted on the extending portion of the frame at a location outside of said triangle and normally projecting below the plane of said feet whereby in use the instrument may be positioned on two of its feet and the scriber accurately positioned at the point of marking and thereafter the third foot may be moved to engagement with the supporting surface so that the scriber may be used to follow a guiding edge while remaining in view of the user.

2. A scribing instrument comprising a frame having three legs, the free ends defining supporting feet arranged in triangular relation to form an imaginary triangle, said frame having a portion extending outside of said imaginary triangle in a direction opposite one of said legs and generally between the other two legs or feet, a resiliently pressed scribing tool mounted on the extending portion of the frame at a location outside of said triangle and normally projecting below the plane of said feet whereby in use the instrument may be positioned on two of its feet and the scriber accurately positioned at the point of marking and thereafter the third foot may be moved to engagement with the supporting surface so that the scriber may be used to follow a guiding edge while remaining in view of the user, and a handle mounted within the triangle of said frame intermediate said feet.

3. A scribing instrument comprising a frame having three legs, the free ends defining supporting feet arranged in triangular relation to form an imaginary triangle, said frame having a portion extending outside of said imaginary triangle in a direction opposite one of said legs and generally between the other two legs or feet, a resiliently pressed scribing tool mounted on the extending portion of the frame at a location outside of said triangle and normally projecting below the plane of said feet whereby in use the instrument may be positioned on two of its feet and the scriber accurately positioned at the point of marking and thereafter the third foot may be moved to engagement with the supporting surface so that the scriber may be used to follow a guiding edge while remaining in view of the user, and a segment of a lens mounted on the frame for pivotal movement about vertical axis and a horizontal axis with respect to the scribing tool.

References Cited in the file of this patent

UNITED STATES PATENTS

| 1,830,377 | Storm | Nov. 3, 1931 |
| 2,178,755 | Johnson | Nov. 7, 1939 |
| 2,524,636 | Preis et al. | Oct. 3, 1950 |
| 2,659,143 | Baker | Nov. 17, 1953 |
| 2,660,791 | Howell et al. | Dec. 1, 1953 |
| 2,735,178 | Adams | Feb. 21, 1956 |
| 2,748,474 | Brown | June 5, 1956 |
| 2,805,475 | Adams | Sept. 10, 1957 |